US012594705B2

(12) United States Patent
Lee et al.

(10) Patent No.: US 12,594,705 B2
(45) Date of Patent: Apr. 7, 2026

(54) INJECTION MOLD APPARATUS FOR PRESSURE VESSEL

(71) Applicants: Hyundai Motor Company, Seoul (KR); Kia Corporation, Seoul (KR)

(72) Inventors: Ha Yong Lee, Whasung-Si (KR); Ju Il Kim, Whasung-Si (KR); Se Young Kim, Whasung-Si (KR); Eui Hwan Son, Whasung-Si (KR); Min Woo Chu, Whasung-Si (KR); Ji Won Choi, Whasung-Si (KR); Su Jeong Kang, Whasung-Si (KR); Kyuyoung Lee, Whasung-Si (KR); Young Rok Yoon, Whasung-Si (KR); Keon Chul Lee, Whasung-Si (KR); Sukjoo Hong, Whasung-Si (KR); Tae-Oh Kwon, Whasung-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 739 days.

(21) Appl. No.: 17/961,971

(22) Filed: Oct. 7, 2022

(65) Prior Publication Data

US 2023/0121190 A1 Apr. 20, 2023

(30) Foreign Application Priority Data

Oct. 14, 2021 (KR) ........................ 10-2021-0136649

(51) Int. Cl.
B29C 45/43 (2006.01)
B29C 45/76 (2006.01)
(Continued)

(52) U.S. Cl.
CPC .......... B29C 45/7626 (2013.01); B29C 45/43 (2013.01); G05B 19/042 (2013.01);
(Continued)

(58) Field of Classification Search
CPC ..... B29C 45/40; B29C 45/43; B29C 45/7626; B29C 2045/4063; B29C 2945/7624;
(Continued)

(56) References Cited

U.S. PATENT DOCUMENTS 4,289,726 A * 9/1981 Potoczky ................ B29C 45/26
264/318
4,364,895 A 12/1982 Underwood
(Continued)

FOREIGN PATENT DOCUMENTS

| JP | S58-29641 A | 2/1983 |
| JP | 03-176115 A | 7/1991 |
| JP | 2002-178354 A | 6/2002 |
| JP | 2014-000767 A | 1/2014 |
| KR | 10-2013-0013560 A | 2/2013 |

*Primary Examiner* — Alvin H Tan
(74) *Attorney, Agent, or Firm* — MORGAN, LEWIS & BOCKIUS LLP

(57) ABSTRACT

An injection mold apparatus of a pressure vessel includes an upper mold including an internal surface in a shape corresponding to a shape of an external surface of the pressure vessel provided with a nozzle with a closed inlet; a lower mold including an external surface in a shape corresponding to the shape of the internal surface of the pressure vessel, engaged with the upper mold, and formed with an air injection passage therein; an ejector injecting air through the air injection passage between the lower mold and the taken-out pressure vessel; an air injection rate setting device configured for controlling an injection rate of the air injected between the lower mold and the pressure vessel using the ejector; and a pneumatic controller interlocking with the air injection rate setting device and controlling a pressure of air injected.

9 Claims, 5 Drawing Sheets

(51) Int. Cl.
  *G05B 19/042* (2006.01)
  *B29L 31/00* (2006.01)

(52) U.S. Cl.
  CPC .............. *B29C 2945/76096* (2013.01); *B29C
    2945/7624* (2013.01); *B29C 2945/76418*
    (2013.01); *B29C 2945/76498* (2013.01); *B29C
    2945/76719* (2013.01); *B29C 2945/76896*
    (2013.01); *B29L 2031/7156* (2013.01); *G05B
      2219/2624* (2013.01)

(58) Field of Classification Search
  CPC ........... B29C 2945/76418; B29C 2945/46719;
      B29C 2945/76896
  See application file for complete search history.

(56) References Cited

U.S. PATENT DOCUMENTS

| | | | | |
|---|---|---|---|---|
| 4,380,303 | A | * | 4/1983 | Allen ..................... B65D 15/18 |
| | | | | 220/604 |
| 4,531,703 | A | * | 7/1985 | Underwood ........ B29C 45/4407 |
| | | | | 425/577 |
| 4,632,657 | A | * | 12/1986 | Potoczky ................ B29C 45/26 |
| | | | | 425/577 |
| 5,645,866 | A | * | 7/1997 | Eckardt .............. B29C 45/1732 |
| | | | | 264/572 |
| 5,882,700 | A | * | 3/1999 | Asai ..................... B29C 45/263 |
| | | | | 425/437 |
| 10,195,774 | B2 | * | 2/2019 | Kobune ................. B29C 45/43 |

* cited by examiner

FIG. 3

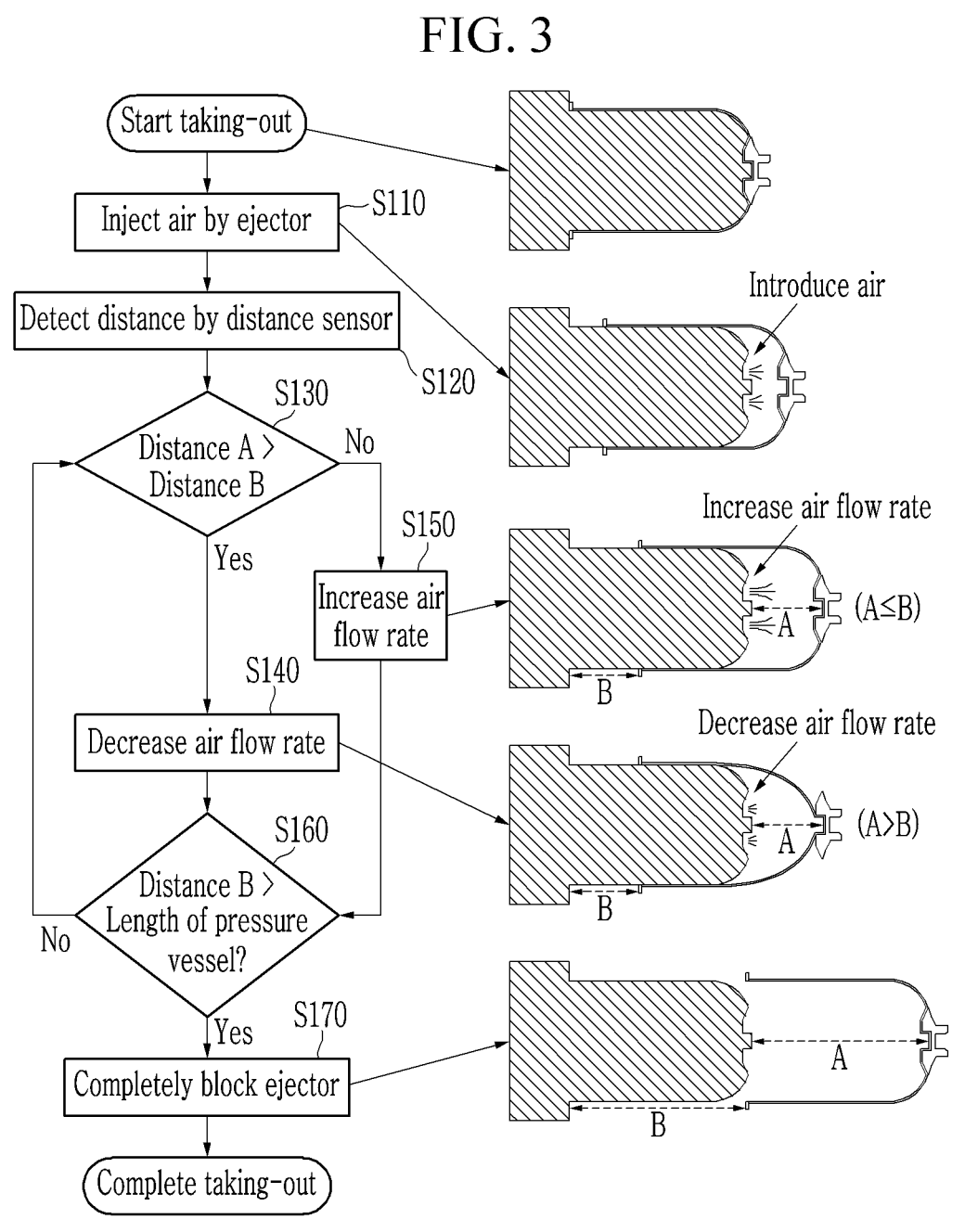

Start taking-out

Inject air by ejector ─ S110

Detect distance by distance sensor

S120

S130
Distance A > Distance B

No

Yes

S150
Increase air flow rate

S140
Decrease air flow rate

S160
Distance B > Length of pressure vessel?

No

Yes          S170

Completely block ejector

Complete taking-out

Introduce air

Increase air flow rate $(A \leq B)$

A

B

Decrease air flow rate $(A > B)$

Figure 5:
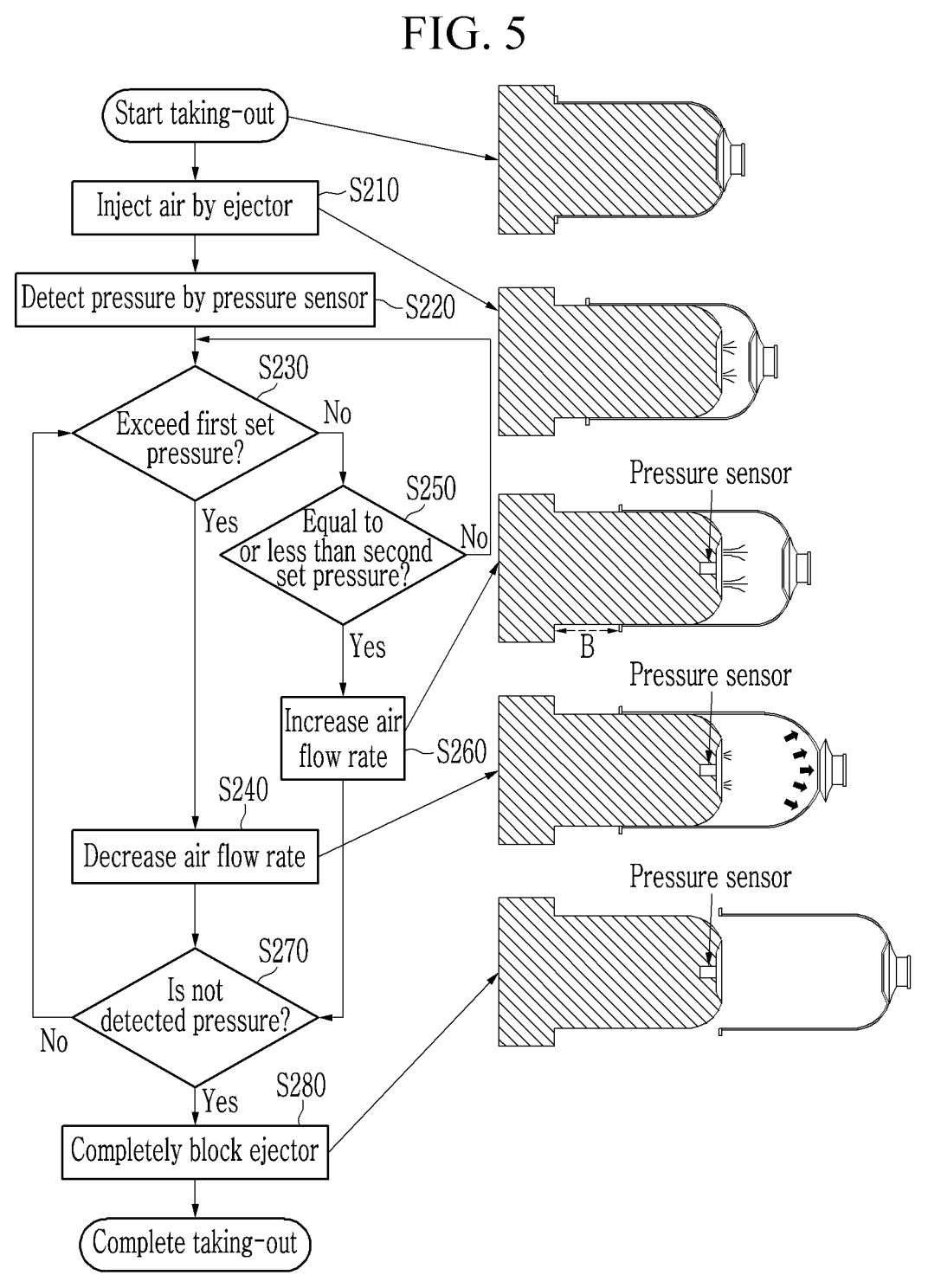

Start taking-out

Inject air by ejector —S210

Detect pressure by pressure sensor —S220

S230
Exceed first set pressure? → No

Yes

S250
Equal to or less than second set pressure? → No

Yes

Increase air flow rate —S260

Decrease air flow rate —S240

S270
Is not detected pressure? → No

Yes  S280

Completely block ejector

Complete taking-out

Pressure sensor

B

Pressure sensor

Pressure sensor

INJECTION MOLD APPARATUS FOR PRESSURE VESSEL

CROSS-REFERENCE TO RELATED APPLICATION

The present application claims priority to Korean Patent Application No. 10-2021-0136649 filed on Oct. 14, 2021, the entire contents of which is incorporated herein for all purposes by this reference.

BACKGROUND OF THE PRESENT DISCLOSURE

Field of the Present Disclosure

The present disclosure relates to an injection mold apparatus of a pressure vessel, and more particularly, to an injection mold apparatus of a pressure vessel, which accurately controls the amount of air injection to be injected into a space between a lower mold and an injection molded product when the injection molded product is taken out from a mold after the injection molded product is formed by use of the injection mold, to prevent appearance deformation caused by the contraction or the expansion of the injection molded product.

Description of Related Art

Injection molding is a method of producing products by melting and injecting various resin raw materials into a mold, and has the advantage of mass production of products requiring high precision, so that the demand thereof continues to increase along with the development of mold technology.

The injection molding used for injection molding generally includes an upper mold including an internal surface of a shape corresponding to an external surface of an injection molded product, and a lower mold including an external surface having a shape corresponding to the internal surface of the injection molded product and being engaging with the upper mold.

In the state where the upper mold is engaged with the lower mold, the injection molded product is molded in a cavity formed between the upper mold and the lower mold, and when the molding of the injection molded product is completed, the product is completed by separating the upper mold and the lower mold and then taking the process of taking out the injection molded product from the lower mold.

FIG. 1 is a top plan view exemplarily illustrating a modified example of an injection molded product when the injection molded product is taken out from an injection mold apparatus in the related art.

However, in the injection mold apparatus generally, when the molding of the product is completed in the cavity, and when the upper mold and the lower mold are separated, and then the injection molded product is taken out from the lower mold, the air is injected into the space between the external surface of the lower mold and the internal surface of the injection molded product by a manual control method, so that the product is taken out.

However, as shown in FIG. 1, in the present process, in the injection mold apparatus generally, the air is injected by the manual control method, and there is no basis for the determination on how to adjust the air amount injected and the reference of the adjustment of the air amount injected, so that there are problems in that in the event of increasing the air amount injected, the product is expanded and the appearance is deformed, and in the event of decreasing the amount of air injection is low, the product is contracted and distorted and thus the exterior of the product is damaged.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an injection mold apparatus of a pressure vessel, which accurately is configured to control the amount of air injection to be injected into a space between a lower mold and an injection molded product when the injection molded product is taken out from a mold after the injection molded product is formed by use of the injection mold, to prevent appearance deformation caused by the contraction or the expansion of the injection molded product.

Various aspects of the present disclosure are directed to providing an injection mold apparatus of a pressure vessel, the injection mold apparatus, including: an upper mold including an internal surface in a shape corresponding to a shape of an external surface of the pressure vessel provided with a nozzle with a closed inlet; a lower mold having an external surface in a shape corresponding to the shape of the internal surface of the pressure vessel, engaged with the upper mold, formed with a cavity for injection of the pressure vessel between the upper mold and the lower mold, and formed with an air injection passage therein; an ejector fluidically-communicating with the air injection passage of the lower mold and injecting air through the air injection passage between the lower mold and the taken-out pressure vessel; an air injection rate setting device configured for controlling an injection rate of the air injected between the lower mold and the pressure vessel using the ejector; and a pneumatic controller interlocking with the air injection rate setting device and controlling a pressure of the air injected between the lower mold and the pressure vessel.

The air injection rate setting device may include: a first distance measuring device provided in a nozzle receiving recess which is formed in the lower mold and accommodates the nozzle, and measuring a distance between an external surface of the nozzle receiving recess and an end portion of the nozzle; and a second distance measuring device provided at the end portion of the lower mold and measuring a distance between the end portion of the lower mold and an end portion of the pressure vessel.

When the distance measured by the first distance measuring device is longer than the distance measured by the second distance measuring device, the pneumatic controller may stop injecting the air by the ejector, and when the distance measured by the first distance measuring device is equal to or shorter than the distance measured by the second distance measuring device, the pneumatic controller may cause the air injection to proceed by the ejector.

The air injection rate setting device according to various exemplary embodiments of the present disclosure may include a pressure sensor is provided in a nozzle receiving recess which is formed in the lower mold and accommodates the nozzle to detect the pressure in the space between the lower mold and the pressure vessel in real time.

When the pressure in the space between the lower mold and the pressure vessel measured by the pressure sensor exceeds a first set pressure, the pneumatic controller may stop injecting the air by the ejector, and when the pressure in the space between the lower mold and the pressure vessel is equal to or less than a second set pressure, the pneumatic controller may cause the air injection to proceed by the ejector.

To stop the injecting of the air by the ejector or to allow the injecting of the air to proceed, the ejector may be provided with a solenoid valve at one side.

As described above, the injection mold apparatus of the pressure vessel of the present disclosure has an effect in that it is possible to prevent the appearance of the product from being deformed due to the expansion or contraction of the injection-molded product caused by failing to accurately controlling the air amount to be injected into the space between the lower mold and the injection molded product when the injection molded product is taken out from the mold after the injection molded product is formed by use of the injection mold.

Furthermore, because the process of taking out the injection-molded product from the mold is performed rapidly and easily after the molding of the injection-molded product is completed, there is an effect of increasing the satisfaction in operation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is a block diagram illustrating a process of taking out an injection molded product from the injection mold apparatus of the pressure vessel according to the exemplary embodiment of the present disclosure.

FIG. 5 is a block diagram illustrating a process of taking out an injection molded product from the injection mold apparatus of the pressure vessel according to various exemplary embodiments of the present disclosure.

Figure 1:
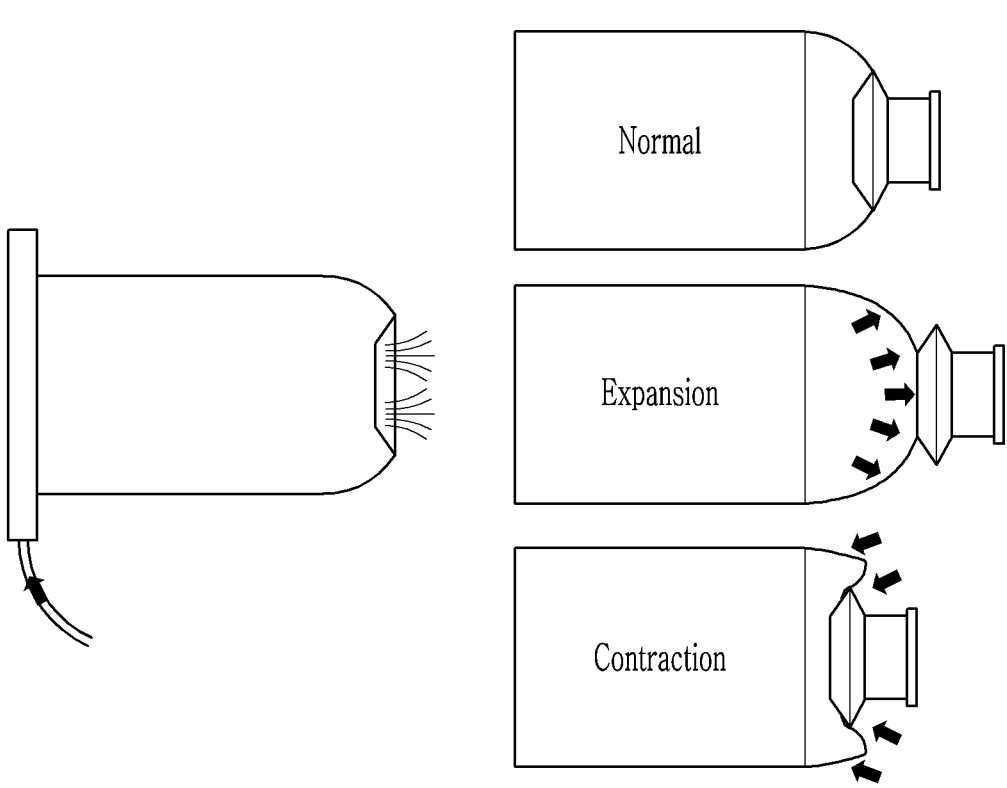
FIG. 1 is a top plan view exemplarily illustrating a modified example of an injection molded product when the injection molded product is taken out from an injection mold apparatus in the relate dart.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an injection mold apparatus of a pressure vessel according to various exemplary embodiments of the present disclosure will be described in more detail with reference to the accompanying drawings.

Figure 2:
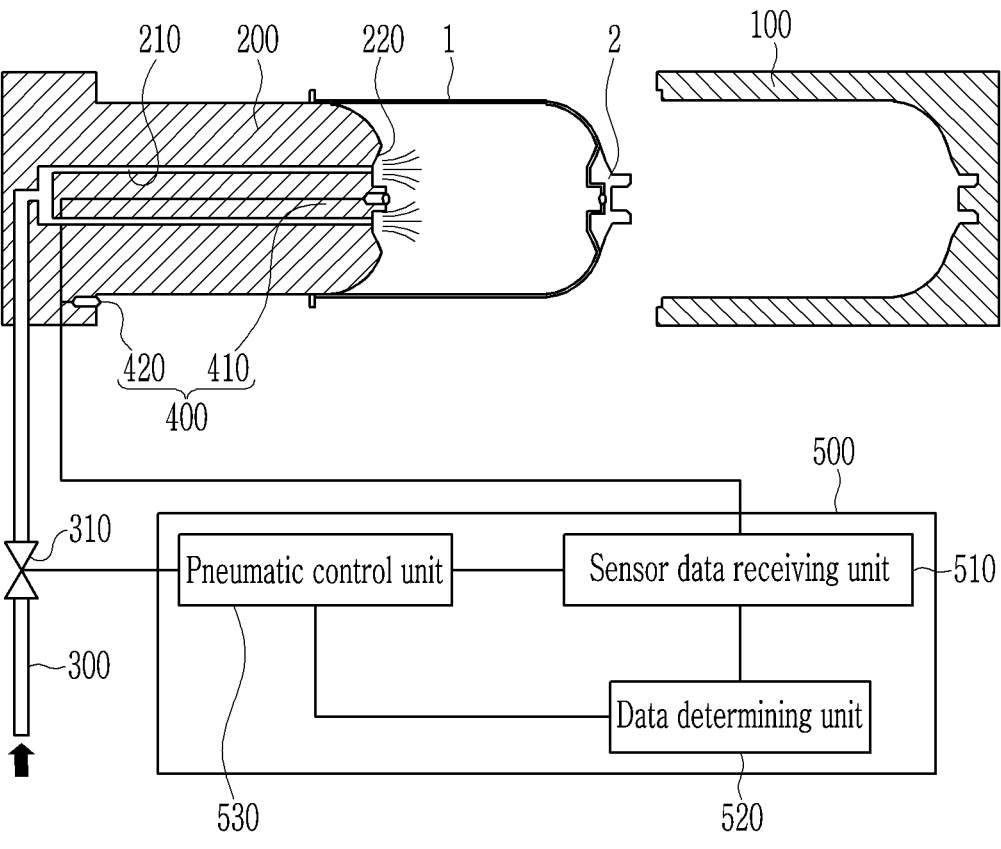
FIG. 2 is a top plan view exemplarily illustrating a structure of an injection mold apparatus of a pressure vessel according to various exemplary embodiments of the present disclosure.
Figure 4:
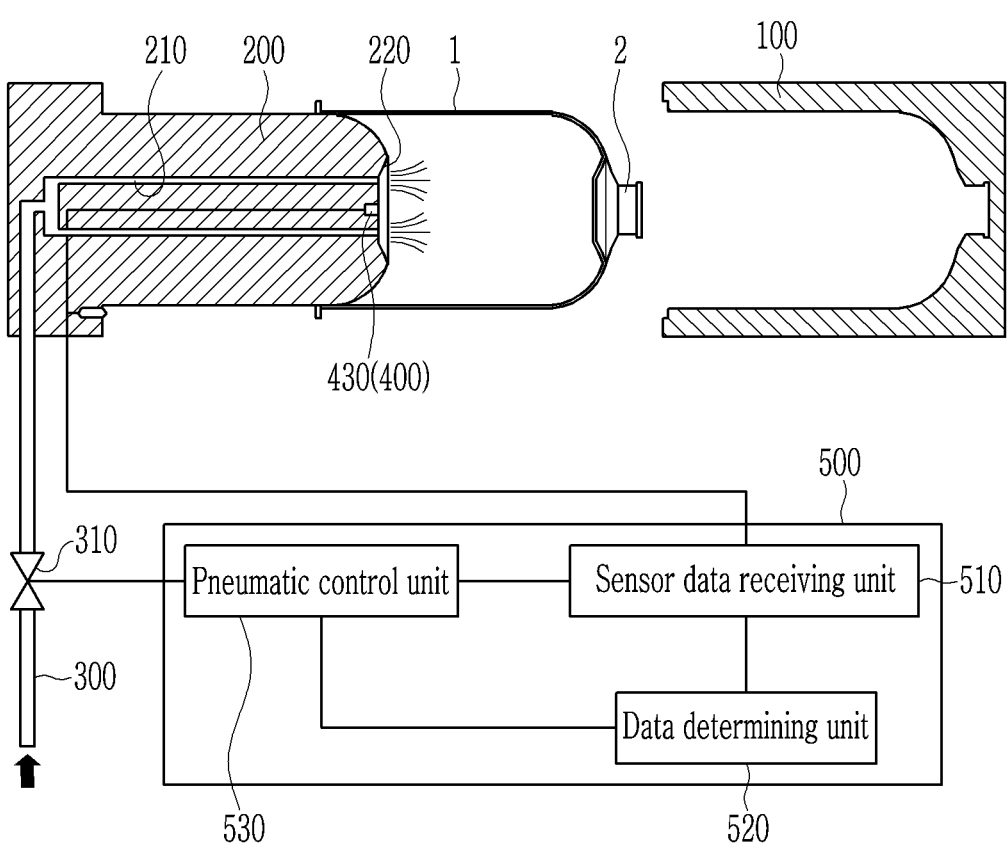
FIG. 4 is a top plan view exemplarily illustrating a structure of an injection mold apparatus of a pressure vessel according to various exemplary embodiments of the present disclosure.

FIG. 2 is a top plan view exemplarily illustrating a structure of an injection mold apparatus of a pressure vessel according to various exemplary embodiments of the present disclosure, FIG. 3 is a block diagram illustrating a process of taking out an injection molded product from the injection mold apparatus of the pressure vessel according to the exemplary embodiment of the present disclosure, FIG. 4 is a top plan view exemplarily illustrating a structure of an injection mold apparatus of a pressure vessel according to various exemplary embodiments of the present disclosure, and FIG. 5 is a block diagram illustrating a process of taking out an injection molded product from the injection mold apparatus of the pressure vessel according to various exemplary embodiments of the present disclosure.

As illustrated in the drawings, the injection mold apparatus of a pressure vessel according to various exemplary embodiments of the present disclosure may include: an upper mold 100 including an internal surface formed in a shape corresponding to an external surface shape of a pressure vessel 1 provided with a nozzle 2 including a closed inlet; a lower mold 200 including an external surface formed in a shape corresponding to an internal surface shape of the pressure vessel 1, engaged with the upper mold 100, including a cavity for injection of the pressure vessel 1 between the lower mold 200 and the upper mold 100, and including an air injection passage 210 formed therein; an ejector 300 provided on one side of the lower mold 200 to fluidically-communicate with the air injection passage 210 and injecting air through the air injection passage 210 between the lower mold 200 and the taken-out pressure vessel 1; an air injection rate setting device 400 for adjusting an injection rate of air to be injected between the lower mold 200 and the pressure vessel 1 using the ejector 300; and a pneumatic controller 500 for controlling the pressure of the injected air in conjunction with the air injection rate setting device 400.

The upper mold 100 is a member including an internal surface including a shape corresponding to an external surface shape of the pressure vessel 1 provided with the nozzle 2 in a state where an inlet is closed, and forms a cavity between the upper mold 100 and the external surface of the lower mold 200 in a state in which the lower mold 200 is inserted into the upper mold 100, so that the pressure vessel is molded.

In the state where the lower mold 200 is inserted into and engaged with the upper mold 100, a cavity is formed between the external surface of the lower mold 200 and the internal surface of the upper mold 100 so that the pressure vessel is molded, and the air injection passage 210 is formed therein.

The air injection passage 210 is formed to penetrate from the lower external surface of the lower mold 200 to the central region and then is formed to extend to the upper end portion of the lower mold 200, and when air is introduced from the lower external surface of the lower mold 200, the air is injected through the upper end portion of the lower mold 200.

The ejector 300 is provided in fluidical communication with the inlet of the air injection passage 210 formed on the lower external surface of the lower mold 200, and injects air through the air injection passage 210.

To stop the injecting of the air by the ejector 300 or to allow the injecting of the air to proceed, the ejector 300 is provided with a solenoid valve 310, and a pressure at which air is introduced may be adjusted by adjusting the degree of opening of the solenoid valve 310, or the inflow of air may be prevented by closing the solenoid valve 310.

As illustrated in FIG. 2 and FIG. 3, the air injection rate setting device 400 according to the exemplary embodiment of the present disclosure includes a first distance measuring device 410 provided in a nozzle receiving recess 220 which is formed in the lower mold 200 and accommodates the nozzle 2, and measuring a distance between the external surface of the nozzle receiving recess 220 and the end portion of the nozzle 2, and a second distance measuring device 420 provided at an end portion of the lower mold 200 and measuring a distance between the end portion of the lower mold 200 and an end portion of the pressure vessel 1.

The first distance measuring device 410 is configured to measure a distance between an external surface of the nozzle receiving recess 220 formed at the upper end portion of the lower mold 200 and the lower end portion of the nozzle 2 provided in the pressure vessel 1 when the pressure vessel 1 is taken out from the lower mold 200.

Furthermore, the second distance measuring device 420 is configured to measure a distance between the end portion of the lower mold 200 and the lower end portion of the pressure vessel 1 when the pressure vessel 1 is taken out from the lower mold 200.

As described above, when the distance measured by the first distance measuring device 410 is longer than the distance measured by the second distance measuring device 420 based on the data measured by the first distance measuring device 410 and the second distance measuring device 420, it is determined that the pressure in the space between the lower mold 200 and the pressure vessel is excessive, so that the injection of air by the ejector 300 is stopped to prevent the expansion of the pressure vessel 1.

On the other hand, when the distance measured by the first distance measuring device 410 is equal to or shorter than the distance measured by the second distance measuring device 420, it is determined that the pressure in the space between the lower mold 200 and the pressure vessel 1 is low, so that air injection by the ejector 300 is performed to prevent the contraction of the pressure vessel 1.

As illustrated in FIG. 4 and FIG. 5, the air injection rate setting device 400 according to various exemplary embodiments of the present disclosure may include a pressure sensor 430 provided in the nozzle receiving recess 220 which is formed in the lower mold 200 and accommodates the nozzle 2 to detect the pressure in the space between the lower mold 200 and the pressure vessel 1 in real time.

The pressure sensor 430 is disposed in the nozzle receiving recess 220 formed at the upper end portion of the lower mold 200, and detects the pressure in the space between the lower mold 200 and the pressure vessel 1 in real time, so that when the pressure in the space between the lower mold 200 and the pressure vessel 1 exceeds a first set pressure (for example, 4 bar) based on the data measured by the pressure sensor 430, it is determined that the pressure in the space between the lower mold 200 and the pressure vessel 1 is excessive, and the injection of air by the ejector 300 is stopped to prevent the expansion of the pressure vessel 1.

On the other hand, when the pressure in the space between the lower mold 200 and the pressure vessel 1 is equal to or lower than a second set pressure (for example, 3 bar) based on the data measured by the pressure sensor 430, it is determined that the pressure in the space between the lower mold 200 and the pressure vessel 1 is low, so that air injection is performed by the ejector 300 to prevent the contraction of the pressure vessel 1.

In the meantime, the pneumatic controller 500 may include a sensor data receiving unit 510 connected to the air injection rate setting device 400 to receive data measured by the air injection rate setting device 400, a data determining unit 520 for analyzing the data received by the sensor data receiving unit 510, and a pneumatic control unit 530 connected to the solenoid valve 310 to control the air pressure.

When the air injection rate needs to be increased based on the data measured by the air injection rate setting device 400, the pneumatic controller 500 is configured to increase the pneumatic pressure to increase the air injection rate, and on the contrary, when the air injection rate needs to be lowered, the pneumatic controller 500 is configured to lower the pneumatic pressure to decrease the air injection rate.

The sensor data receiving unit 510 is connected to the first distance measuring device 410, the second distance measuring device 420, or the pressure sensor 430, which is the air injection rate setting device 400, and is configured to receive the data measured by the first distance measuring device 410, the second distance measuring device 420, or the pressure sensor 430.

The data determining unit 520 analyzes the data received by the sensor data receiving unit 510, and when the air injection rate needs to be increased, the data determining unit 520 determines that the pneumatic pressure needs be increased to increase the air injection rate so that the pneumatic control unit 530 is configured for controlling the pneumatic pressure, on the other hand, when the air injection rate needs to be decreased, the data determining unit 520 determines that the pneumatic pressure needs be decreased to decrease the air injection rate.

The pneumatic control unit 530 receives the signal of the result of the analysis and the determination by the data determining unit 520 and controls the solenoid valve 310 connected to the rear end portion of the pneumatic control unit 530 to adjust the degree of opening of the solenoid valve 310 or whether to open or close the solenoid valve 310.

The process of taking out the pressure vessel from the lower mold using the injection mold apparatus of the pressure vessel according to the exemplary embodiment of the present disclosure including the configuration as described above will be described with reference to FIGS. 3 and 5 as follows.

As shown in FIG. 3, according to the injection mold apparatus of the pressure vessel according to the exemplary embodiment of the present disclosure, to remove the upper mold 100 after the molding of the pressure vessel 1 is completed between the upper mold 100 and the lower mold 200 and take out the pressure vessel 1 from the lower mold 200, as air is injected through the air injection passage 210 by the ejector 300, the completely-molded pressure vessel 1 which is being in contact with the lower mold 200 is slowly moved to the outside of the lower mold 200 (S110).

In the instant case, the first distance measuring device 410 and the second distance measuring device 420, which are the air injection rate setting device 400, respectively, measure the distance between the external surface of the nozzle receiving recess 220 and the end portion of the nozzle 2, and the distance between the end portion of the lower mold 200 and the end portion of the pressure vessel 1 (S120).

The data measured by the first distance measuring device 410 and the second distance measuring device 420 are received by the sensor data receiving unit 510 of the pneumatic controller 500, and the data determining unit 520 analyzes the data and the pneumatic control unit 530 is configured to control the operation of the solenoid valve 310 according to the analysis result of the data determining unit 520 to adjust the air amount injected by the ejector 300.

Based on the data measured by the first distance measuring device 410 and the second distance measuring device 420, when a distance A measured by the first distance measuring device 410 is longer than a distance B measured by the second distance measuring device 420 (S130), the data determining unit 520 of the pneumatic controller 500 concludes that the pressure in the space between the lower mold 200 and the pressure vessel 1 is excessive. Accordingly, the pneumatic control unit 530 closes the solenoid valve 310 so that the injection of air by the ejector 300 is stopped to prevent the expansion of the pressure vessel 1, and as a result, the air flow rate supplied to the ejector 300 is decreased (S140).

On the other hand, when the distance A measured by the first distance measuring device 410 is equal to or shorter than the distance B measured by the second distance measuring device 420 (S130), the data determining unit 520 of the pneumatic controller 500 concludes that the pressure in the space between the lower mold 200 and the pressure vessel is low. Accordingly, to prevent the contraction of the pressure vessel 1, the pneumatic control unit 530 adjusts the degree of opening of the solenoid valve 310 and injects air by the ejector 300 to allow the pressure vessel 1 to be taken out from the lower mold 200 (S150).

When the distance B measured by the second distance measuring device 420 is longer than the length of the pressure vessel (S160), the ejector 300 is completely blocked (S170), and the pressure vessel 1 is completely taken out from the lower mold 200.

As shown in FIG. 5, according to the injection mold apparatus of the pressure vessel according to the exemplary embodiment of the present disclosure, to remove the upper mold 100 after the molding of the pressure vessel 1 is completed between the upper mold 100 and the lower mold 200 and take out the pressure vessel 1 from the lower mold 200, as air is injected through the air injection passage 210 by the ejector 300, the completely-molded pressure vessel 1 which is being in contact with the lower mold 200 is slowly moved to the outside of the lower mold 200 (S210).

In the instant case, the pressure in the space between the lower mold 200 and the pressure vessel 1 is detected in real time by use of the pressure sensor 430, which is the air injection rate setting device 400 (S120), and when the pressure in the space between the lower mold 200 and the pressure vessel 1 based on the data measured by the pressure sensor 430 exceeds the first set pressure (for example, 4 bar), the data determining unit 520 of the pneumatic controller 500 concludes that the pressure in the space between the lower mold 200 and the pressure vessel is excessive.

Accordingly, the pneumatic control unit 530 closes the solenoid valve 310 so that the injection of air by the ejector 300 is stopped to prevent the expansion of the pressure vessel 1.

On the other hand, when the pressure in the space between the lower mold 200 and the pressure vessel 1 based on the data measured by the pressure sensor 430 is equal to or lower than the second set pressure (for example, 3 bar) which is smaller than the first set pressure (S250), the data determining unit 520 of the pneumatic controller 500 concludes that the pressure in the space between the lower mold 200 and the pressure vessel is low. Accordingly, to prevent the contraction of the pressure vessel 1, the pneumatic control unit 530 adjusts the degree of opening of the solenoid valve 310 and injects air by the ejector 300 to allow the pressure vessel 1 to be taken out from the lower mold 200 (S260).

When the pressure is not detected by the pressure sensor 430 (S270), the ejector 300 is completely blocked (S280), and the pressure vessel 1 is completely taken out from the lower mold 200.

The injection mold apparatus of the pressure vessel including the above configuration is configured for preventing the appearance of the product from being deformed due to the expansion or contraction of the injection-molded product caused by failing to accurately controlling the air amount to be injected into the space between the lower mold and the injection molded product when the injection molded product is taken out from the mold after the injection molded product is formed by use of the injection mold.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An injection mold apparatus of a pressure vessel, the injection mold apparatus comprising:
an upper mold including an internal surface in a shape corresponding to a shape of an external surface of the pressure vessel provided with a nozzle with a closed inlet;
a lower mold including an external surface in a shape corresponding to the shape of the internal surface of the pressure vessel, engaged with the upper mold, formed with a cavity for injection of the pressure vessel between the upper mold and the lower mold, and formed with an air injection passage therein;
an ejector fluidically communicating with the air injection passage of the lower mold and injecting air through the air injection passage between the lower mold and the pressure vessel;
an air injection rate setting device configured for controlling an injection rate of the air injected between the lower mold and the pressure vessel using the ejector; and a pneumatic controller interlocking with the air injection rate setting device and controlling a pressure of the air injected between the lower mold and the pressure vessel,
wherein the air injection rate setting device includes:
a first distance measuring device configured for measuring a distance between an external surface of a nozzle receiving recess and an end portion of the nozzle; and
a second distance measuring device configured for measuring a distance between an end portion of the lower mold and an end portion of the pressure vessel, and
wherein the pneumatic controller is configured to stop injecting the air by the ejector, or proceed the injecting of the air by the ejector based on the distance measured by the first distance measuring device and the distance measured by the second distance measuring device.

2. The injection mold apparatus of claim 1, wherein the air injection rate setting device includes:
the first distance measuring device provided in the nozzle receiving recess which is formed in the lower mold and accommodates the nozzle; and
the second distance measuring device provided at the end portion of the lower mold.

3. The injection mold apparatus of claim 2, wherein
when the distance measured by the first distance measuring device is longer than the distance measured by the second distance measuring device, the pneumatic controller is configured to stop injecting the air by the ejector, and
when the distance measured by the first distance measuring device is equal to or shorter than the distance measured by the second distance measuring device, the pneumatic controller is configured to proceed the injecting of the air by the ejector.

4. The injection mold apparatus of claim 1, wherein the air injection rate setting device includes a pressure sensor provided in the nozzle receiving recess which is formed in the lower mold and accommodates the nozzle to detect a pressure in a space between the lower mold and the pressure vessel in real time.

5. The injection mold apparatus of claim 4, wherein
when the pressure in the space between the lower mold and the pressure vessel measured by the pressure sensor exceeds a first set pressure, the pneumatic controller is configured to stop injecting the air by the ejector, and
when the pressure in the space between the lower mold and the pressure vessel is equal to or less than a second set pressure, the pneumatic controller is configured to proceed the injecting of the air by the ejector.

6. The injection mold apparatus of claim 1, wherein the ejector is provided with a solenoid valve to stop the injecting of the air by the ejector or to allow the injecting of the air to proceed.

7. The injection mold apparatus of claim 6, wherein the pneumatic controller includes:
a sensor data receiving unit connected to the air injection rate setting device to receive data measured by the air injection rate setting device;
a data determining unit for analyzing the data received by the sensor data receiving unit; and
a pneumatic control unit connected to the solenoid valve to control pressure of the air.

8. A method of controlling an injection mold apparatus including an upper mold including an internal surface in a shape corresponding to a shape of an external surface of a pressure vessel provided with a nozzle with a closed inlet, a lower mold including an external surface in a shape corresponding to the shape of the internal surface of the pressure vessel, engaged with the upper mold, formed with a cavity for injection of the pressure vessel between the upper mold and the lower mold, and formed with an air injection passage therein, an ejector fluidically communicating with the air injection passage of the lower mold and injecting air through the air injection passage between the lower mold and the pressure vessel, and an air injection rate setting device, the method comprising:

adjusting, by a controller, a pressure of the air injected between the lower mold and the pressure vessel by controlling the air injection rate setting device according to a distance difference between a distance between an external surface of a nozzle receiving recess and an end portion of the nozzle and a distance between an end portion of the lower mold and an end portion of the pressure vessel;

measuring, by a first distance measuring device, the distance between the external surface of the nozzle receiving recess and the end portion of the nozzle, and measuring, by a second distance measuring device, the distance between the end portion of the lower mold and the end portion of the pressure vessel; and closing the air injection rate setting device, by the controller, or, adjusting a degree of opening of the air injection rate setting device, by the controller, based on the distance measured by the first distance measuring device and the distance measured by the second distance measuring device.

9. The method of claim 8, further including:

when the distance measured by the first distance measuring device is longer than the distance measured by the second distance measuring device, closing the air injection rate setting device, by the controller, so that the injecting of the air by the ejector is stopped to decrease an air flow rate supplied to the ejector, and when the distance measured by the first distance measuring device is equal to or shorter than the distance measured by the second distance measuring device, adjusting the degree of opening of the air injection rate setting device to inject the air by the ejector to allow the pressure vessel to be taken out from the lower mold.

* * * * *